No. 827,869. PATENTED AUG. 7, 1906.
I. JACKSON.
BELT FASTENER.
APPLICATION FILED MAY 28, 1903.
2 SHEETS—SHEET 1.
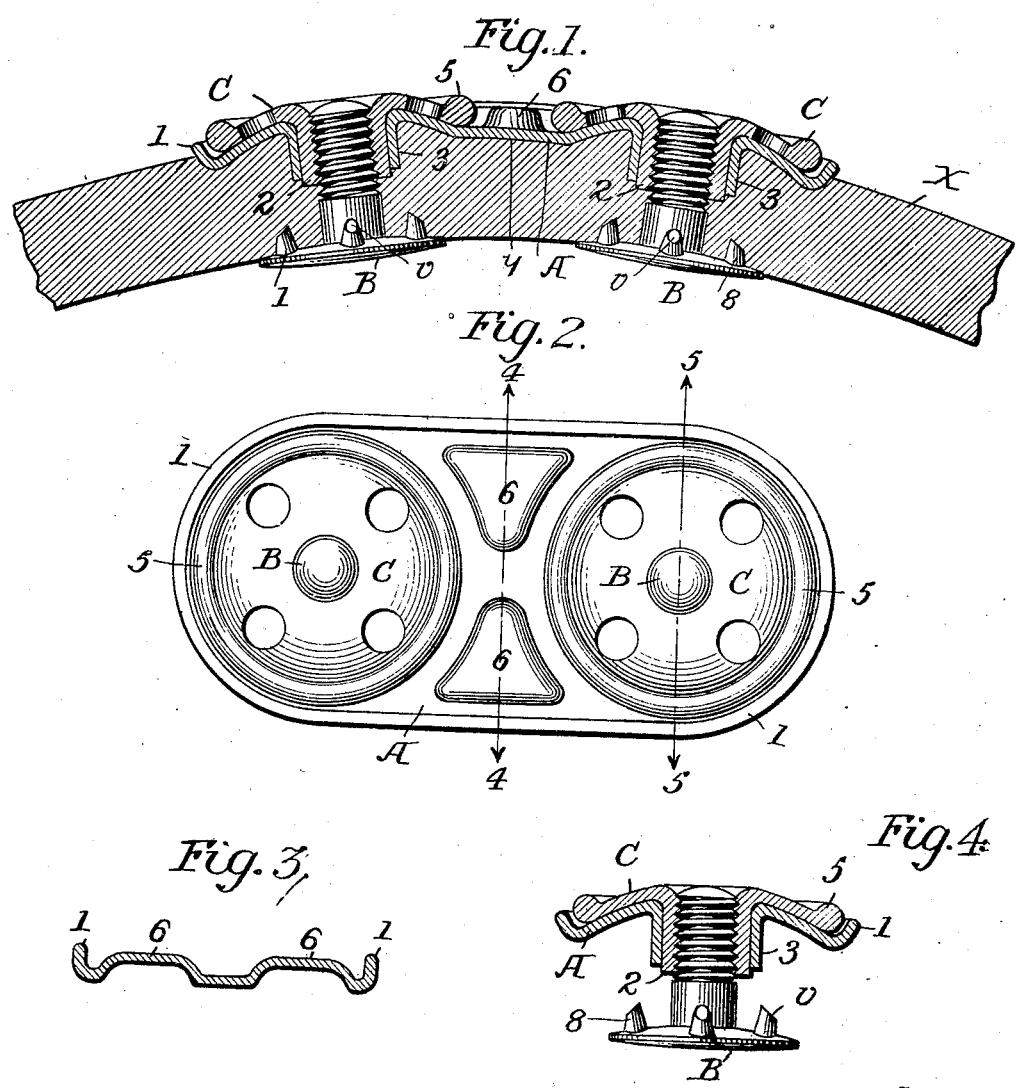

No. 827,869. PATENTED AUG. 7, 1906.
I. JACKSON.
BELT FASTENER.
APPLICATION FILED MAY 28, 1903.

2 SHEETS—SHEET 2.

Witnesses
Inventor
Isaac Jackson,
By
Attorneys

UNITED STATES PATENT OFFICE.

ISAAC JACKSON, OF GLOSSOP, ENGLAND.

BELT-FASTENER.

No. 827,869.  Specification of Letters Patent.  Patented Aug. 7, 1906.

Application filed May 28, 1903. Serial No. 159,137.

*To all whom it may concern:*

Be it known that I, ISAAC JACKSON, a subject of the King of England, residing at Glossop, in the county of Derby, England, have invented certain new and useful Improvements in Belt-Fasteners, of which the following is a specification.

My invention relates to fasteners for belts; and it consists in constructing the same with plates, bolts, and nuts in such manner as to secure very rigid plates while using very light metal, and so as to prevent injury from contact of the heads of the bolts or nuts with other objects, and so as to generally improve the device, as fully set forth hereinafter and as illustrated in the accompanying drawings, in which—

Figure 5:
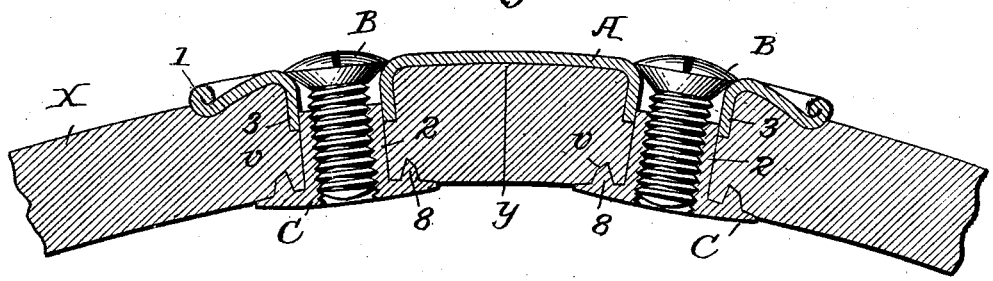
Figure 6:
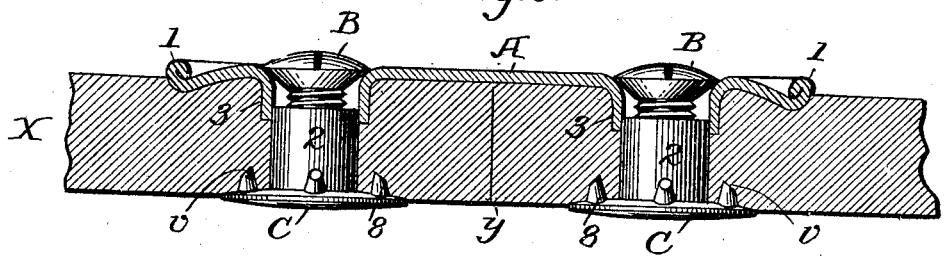
Figure 7:
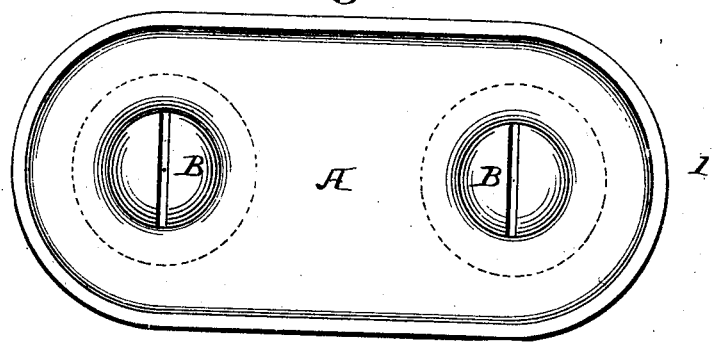

Figure 1 is a longitudinal section of the device applied to the belt. Fig. 2 is a plan view of the device illustrated in Fig. 1, the belt being omitted. Fig. 3 is a cross-section on the line 4 4, Fig. 2. Fig. 4 is a cross-section on the line 5 5, Fig. 2. Fig. 5 is a longitudinal section of a modified form of nut and bolt in which said nuts are at the under side of the belt and the plate is shown curved with the bolt entering from the upper side. Fig. 6 is a similar view showing the plate flat. Fig. 7 is a plan view of the fastener shown in Fig. 6.

The fastener consists, essentially, of three different members or characters of devices, one of which is a perforated plate A and the others representing, respectively, either a bolt B or a nut C, the latter being used in pairs and as many pairs being used as there are openings in the perforated plate.

In the construction of belt-fasteners of this general class it has been common to make them of cast material, and in order that they should be sufficiently strong it has been necessary to make them of relatively thick material, and this is especially true in regard to the central portion of the plate between the openings receiving the nuts and bolts, and it is one of the objects of my present invention to provide rigid plates of relatively light material and so form them as to best secure these advantages. Thus, as shown in the drawings, the plate A, which may be made from a sheet of metal by stamping, forging, or otherwise, is provided with an upturned flange 1, extending around its edge, so that the plate is practically rigid and greatly strengthened and less liable to break, especially through the central point, (indicated by the line 4 4, Fig. 2.) Furthermore, in order to provide additional rigidity and strength the plate is formed with raised portions or bosses 6 6, which may be of any suitable form or arrangement, but which tend in a manner well understood to give rigidity and strength to the plate without increasing its bulk or the amount of metal used therein. As a still further means of strengthening the plate in some instances it is desirable that the upturned flange 1 should have its edge turned inward and flattened down upon itself, as indicated in Figs. 5 and 6.

Passing through each perforation of the plate and through the belt or other device to which the fastener is to be attached is some suitable fastening device, shown in the form of a bolt and nut. The nuts may be applied upon either side of the plate, according to whether the bolts are introduced from one side or the other. Whether the nuts C are applied from one side or the other of the plate they are provided with hubs 2, which hubs extend into the openings in the plate, and these openings are of a diameter sufficient to receive the hubs and are preferably surrounded or formed into projecting collars 3, into which the hubs 2 of the nuts extend. Thus in Figs. 1, 2, and 4 the nuts are shown as extending into the perforations and through the collars 3, while the bolts B fit into the collars and are adapted to bear upon the opposite side of the belt or other material in connection with which the fastener is used.

In Figs. 5, 6, and 7 the nuts C extend from the opposite side of the belt X or other material from that to which the plate A is applied, and, as before, the hubs 2 of the nuts extend into the projecting collars 3 of the plate. In either case the nut takes its bearing against the collar, and the latter instead of the bolt has its side bearing against the edge of the opening in the belt. In the construction shown in Figs. 5, 6, and 7 the hub of the nut also has a side bearing against the edge of the belt-opening, thus securing a more extended contact, resulting in less tendency to tear the belt or draw the bolt through the belt.

The part that bears on the belt on the side opposite to that of the plate, whether it be the bolt or the nut, is preferably provided with rounded tapering pins or projections 8, which enter the material of the belt when the fastener is applied thereto, and these pins have diagonal faces $v$ instead of being pointed, as is usual—that is, the ordinary pointed pins, three-sided pyramids or conical, tend to be thrust outward by side pressure; but by making the pins rounded and tapering with beveled faces they act with a chisel effect in entering the leather, and their sides so abut the material that they effect a firmer hold without any tendency to be thrust outward.

Preferably that portion of the plate A around the collar is arched, forming an annular convex upper surface, and when the flange 5 of the nut C bears on this part of the plate its under side is made concave to fit the arched portion of the plate, and this also tends to give rigidity and stiffness to the plate.

It will thus be seen that the plate thus constructed can be of relatively thin material and still be exceedingly stiff and strong, as the upturned flange around the edge of the plate tends to this result. Further, the bosses 6 also aid in stiffening the plate, and when the collars are used they also add rigidity thereto. In some instances the edge of the flange is turned inward and flattened, as before described, thus insuring the utmost rigidity for the material used. Furthermore, this upturned flange extending around the plate tends to prevent the breaking off or detaching of the heads of the bolts or the nuts by coming in contact with any extraneous device.

What I claim is—

1. A belt-fastener comprising a plate having an upwardly-projecting flange extending around its edge and having a plurality of openings, said plate being provided with bosses between the said openings, and fastening devices extending through said openings and adapted to engage the belt to secure the fastener thereto, substantially as described.

2. A belt-fastener comprising a plate having an upwardly-projecting flange extending around its edge lapped inwardly upon itself and having a plurality of openings, and fastening devices extending through said openings and adapted to engage the belt and secure the fastener thereto, substantially as described.

3. A belt-fastener comprising a plate having an upwardly-projecting flange extending around its edge and having a series of openings and collars around said openings, the plate being arched around said openings, and fastening devices each comprising a bolt and a nut, the latter having a hub extending through said collar and having a concave flange adapted to the arched portion of the plate adjacent the collar, substantially as described.

4. A belt-fastener comprising a plate having an upwardly-projecting flange extending around its edge lapped inwardly upon itself and having a plurality of openings, the plate being arched around the openings, and fastening devices extending through said openings and adapted to engage the belt and secure the fastener thereto, substantially as described.

5. A belt-fastener comprising a plate having an upwardly-projecting flange extending around its edge and having a plurality of openings and collars extending downward from said openings, the plate being arched around each of said openings, and fastening devices each comprising a bolt and a nut, the nut being provided with a hub fitting said collar, substantially as described.

6. A belt-fastener comprising a plate having an upwardly-projecting flange extending around its edge and having a series of openings and collars around said openings, the plate being arched around each of said openings, and fastening devices each comprising a bolt and a nut, the latter having a hub extending through said collar, substantially as described.

In testimony whereof I have signed my name to this specification in the presence of two subscribing witnesses.

ISAAC JACKSON.

Witnesses:
 ARTHUR GEORGE CAMPION,
 ROBERT ALEXANDER McINNIS.